Dec. 20, 1966  N. H. SALTNESS  3,292,295
FISHING PISTOL

Filed Sept. 23, 1964   3 Sheets-Sheet 1

INVENTOR
NORMAN H. SALTNESS

BY *Fisher, Christen, Sabol & Caldwell*

ATTORNEYS

Dec. 20, 1966     N. H. SALTNESS     3,292,295

FISHING PISTOL

Filed Sept. 23, 1964     3 Sheets-Sheet 2

INVENTOR
NORMAN H. SALTNESS

BY *Fisher, Christen, Sabol & Caldwell*

ATTORNEYS

Dec. 20, 1966  N. H. SALTNESS  3,292,295
FISHING PISTOL

Filed Sept. 23, 1964  3 Sheets-Sheet 3

INVENTOR
NORMAN H. SALTNESS

BY *Fisher, Christen, Sabol & Caldwell*
ATTORNEYS

United States Patent Office 3,292,295
Patented Dec. 20, 1966

3,292,295
FISHING PISTOL
Norman H. Saltness, 900 Parker Ave.,
Falls Church, Va. 22046
Filed Sept. 23, 1964, Ser. No. 398,685
4 Claims. (Cl. 43—19)

This invention relates to fishing tackle, and more particularly to a device for projecting a lure attached to a fishing line into the water at a distance from the fisherman.

It is well known that certain types of fish are more attracted to artificial lures which move through the water in a more or less realistic manner resembling the movements of smaller fish. Generally, the way in which these objects can be accomplished is to propel or cast the lure or bait, attached to the line, away from the fisherman into the water as at a great distance as possible and thereafter to bring the lure back toward him by reeling in the line. However, the art of "casting," as this is called, requires not only a fishing rod having a particular quality of elasticity, but is also an art which the inexperienced cannot easily master.

Devices have been known which enable an inexperienced fisherman to "cast" his bait without having to employ the conventional skills required to manipulate the fishing rod. These usually comprise some form of projector operated by a spring mechanism, or by other means which can be held by the fisherman and which, in effect, shoots the bait and a length of line outwardly away from the user. However, these devices are unsatisfactory in that the bait after having been cast sinks to the bottom of the water, or that in the process of casting, the hooks attached to the line have a tendency to fly off from the direct line of travel and to catch on any nearby objects such as trees or foliage.

It is therefore an object of this invention to provide a device capable of being held in a fisherman's hand, and which will project a lure attached to a fishing line in a more or less direct trajectory to a chosen spot in the water at a distance from the fisherman.

One method by which these objects can be accomplished is to provide a projector having a projectile which retains the lure during the flight of the projectile, but which releases the lure and a predetermined length of line upon entering the water.

Another object of the invention is to provide projector means for a fish lure projectile capable of casting the lure out at selectively variable distances.

Still another object of the invention will enable the fisherman to do still fishing in a spot or pool located at a distance from him by allowing him to cast the lure out with a float mechanism which will be operative when the lure descends into the water.

Other objects and advantages will be apparent to those skilled in the art after reading the following specification in connection with the attached drawings in which.

Figure 1:
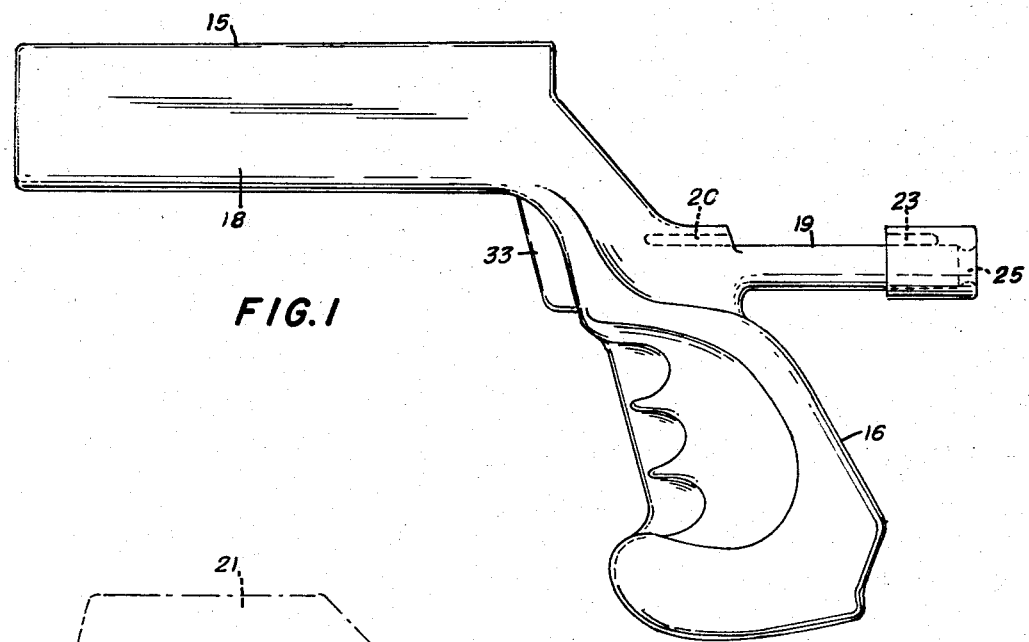
FIG. 1 is a side elevation of a preferred form of lure casting device constructed in accordance with the present invention.
Figure 2:
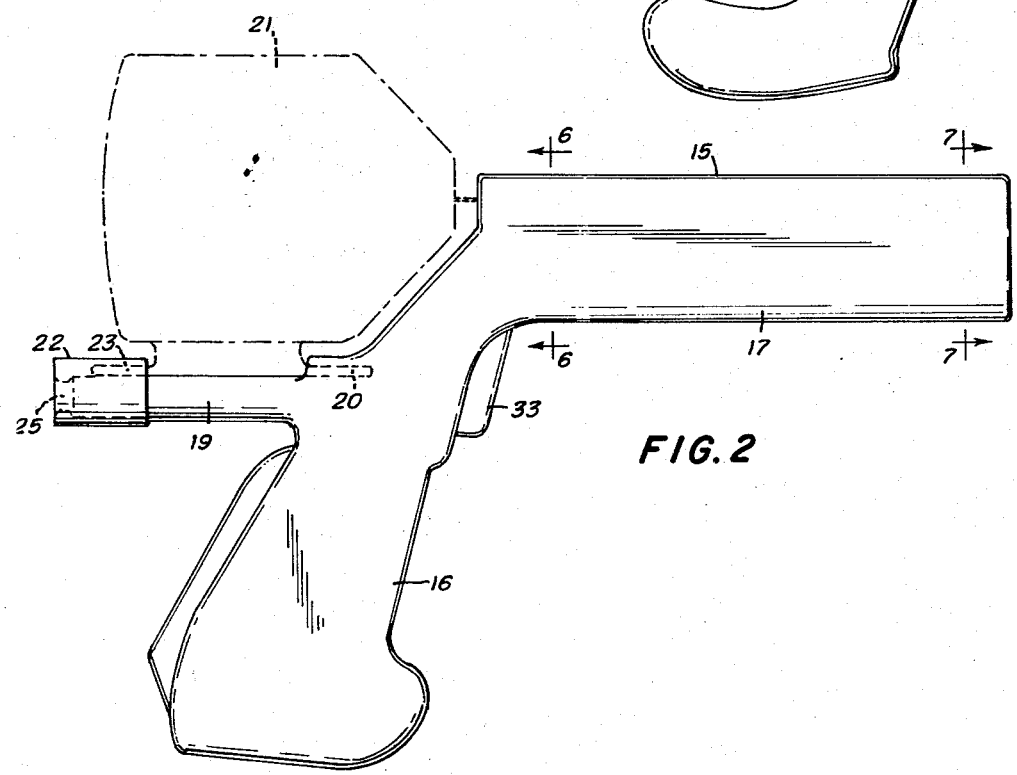
FIG. 2 is also a view in elevation of the device shown in FIG. 1, but taken from the opposite side.
Figure 3:
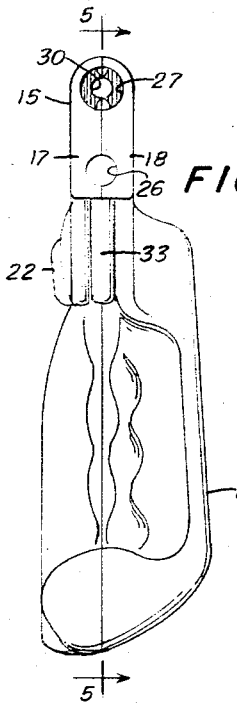
FIG. 3 is an end elevation as viewed from the front.
Figure 4:
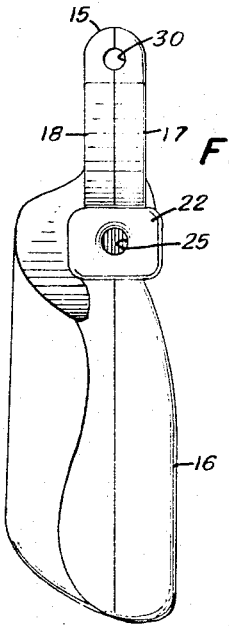
FIG. 4 is a rear-end view.
Figure 6:
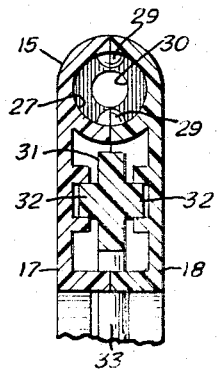
FIG. 6 is a cross-sectional elevation on an enlarged scale taken on the line 6—6 of FIG. 2.
Figure 5:
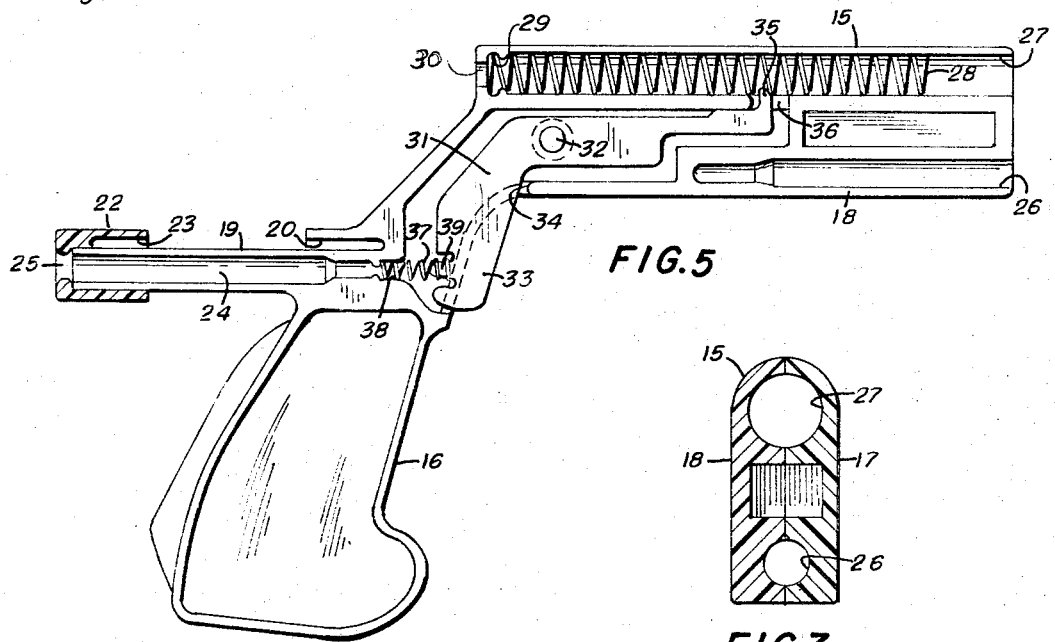
FIG. 5 is a cross-sectional elevation taken on the line 5—5 of FIG. 3.
Figure 7:
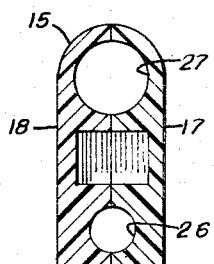
FIG. 7 is a cross-sectional on the same scale as FIG. 6, but taken on the line 7—7 of FIG. 2.

Referring now to the drawings in detail, a preferred form of the invention may be fashioned generally to simulate an automatic pistol, having a simulated barrel 15 and a grip 16 preferably formed by two pieces of molded plastic 17 and 18 which mate with each other along a central vertical plane, as is well known in the art. Projecting rearwardly in a horizontal direction from a position just above the grip, there is provided a reel support 19. At the forward end of this support, there is provided a longitudinally extending recess 20 adapted to receive the forward end of the mounting bracket for a supply of fishing line, such as a conventional spinning reel 21.

A removable cap 22 fits on the rear of the support 19 and may be provided with a recess 23 to engage with the rear mounting bracket of the reel means. Spinning reels of this type are well known in the art, and since the particular type of reel forms no part of this invention, it is believed that a detailed description of their operation is unnecessary.

If desired, the interior 24 of the support 19 may be hollow and the cap may be provided with a central aperture 25 so that, if desired, the projector means could be attached to a fixed support such as a rod (not shown) received within the interior 24. Furthermore, if the fisherman desires to "play" the fish after it has taken the hook, a cylindrical bore 26 may be provided at the forward end of the barrel portion, into which a conventional fishing rod (not shown) may be removably inserted.

Provided within the upper portion of the barrel portion 15 and extending substantially along its entire length is another bore 27 adapted to slidably receive the projectile means as will hereinafter be explained.

Contained within the bore is a coil compression spring 28, the diameter of which is only slightly less than the interior of the bore. The rear end of the spring may be secured in place by molding a pair of projections 29 within the bore, while at the rear end of the bore, there is an aperture 30 through which the line is fed from the reel.

Contained within the interior of the mechanism is a generally L-shaped lever 31 having a pair of medially arranged lateral bosses 32 for pivotal support within suitable cup-shaped recesses in the plastic bodies 17 and 18. The lower end 33 of the lever projects downwardly through a suitable opening 34 positioned just above the grip, the projecting portion 33, in effect, being a simulated trigger for the projector.

The forward end of the lever 31 terminates in an upwardly projecting sear 35 which extends through an opening 36 for operative engagement with the projectile, as will be explained later. A small compression spring 37 having one end seated in a recess 38 and its forward end in engagement with the projection 39 formed on the rear portion of the trigger 33 acts to urge the sear 35 upwardly at all times.

Figure 8:
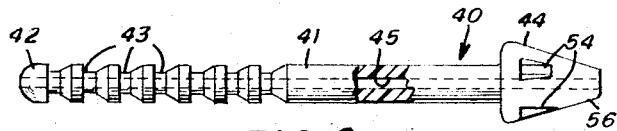
FIG. 8 is a side elevation of one element of a preferred form of projectile means with a portion of the exterior cut away.
Figure 9:
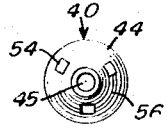
FIG. 9 is a front view of the device shown in FIG. 8.
Figure 10:
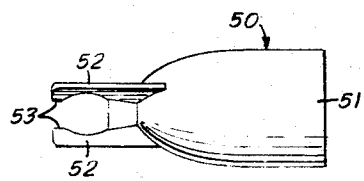
FIG. 10 is a side elevation of another element of the projectile means.
Figure 11:
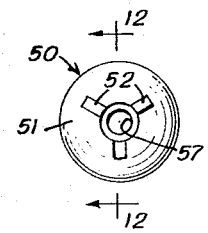
FIG. 11 is a view of the element shown in FIG. 10 looking at it from the left-hand side of the drawing.
Figure 12:
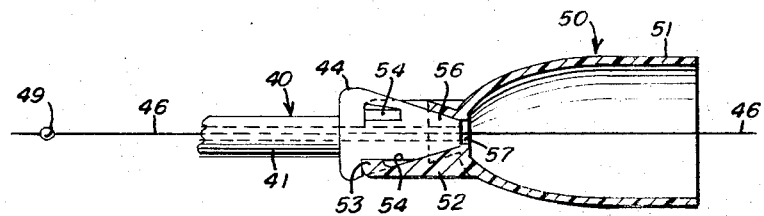
FIG. 12 is a cross-section taken on the line 12—12 of FIG. 11 showing the connection between the two projectile elements.
Figure 13:
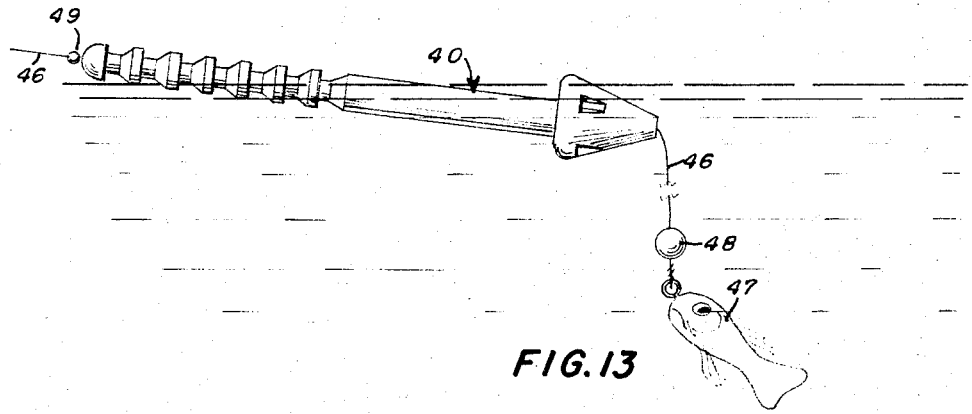
FIG. 13 is a side elevation of the projectile means in operation with the cooperating lure and fishing line.

FIGS. 8 through 13 show the projectile which may be a combined dart and float mechanism, indicated generally by the numeral 40. The main body of this mechanism 41 is preferably composed of a length of plastic material having a diameter such that it will be freely received within the bore 27 of the projector and should have an over-all specific gravity such that it will float when it lands in the water.

The rear end 42 of the dart mechanism may be slightly rounded for engagement with the forward end of the spring 28. The float is also provided with a series of axially spaced annularly arranged notches 43, so that when the dart is inserted into the bore of the projector with the rear end abutting against the spring, one or another of the notches will engage with the sear 35 to retain the dart in place until such time as it is released by pressure against the trigger 33. The forward end of the dart is preferably provided with an enlarged conically bulbous portion 44, which serves as a weight to stabilize the dart while in flight. A passage 45 extends longitudinally throughout the entire length of the dart, through which the fishing line 46 passes, as will be later explained.

In one form of the invention, the line 46, after passing through the passage 45, may be connected in the usual manner to an artificial lure such as a plug, or bait 47, and may also have the usual weight or sinker 48 attached thereto. In addition, a stop mechanism such as the usual split lead ball 49 should be attached to the line a distance rearwardly of the dart mechanism equal to the distance to which it is desired that the lure is to descend into the water after the projectile or dart has been cast. This stop mechanism should be large enough so that it will not pass through the passage 45 in the dart, but it should also be small enough to pass easily through the aperture 30 in the rear of the projectile and to be wound upon the reel 21.

In an alternative form of the invention, a bait cup, indicated generally by the numeral 50, may be substituted for the lure 47. This bait cup comprises a generally cup-shaped body 51 having a plurality of rearwardly extending integrally molded supporting legs 52, the rear ends of these legs having radially inwardly directed knobs 53 arranged to be frictionally received in the cooperating recesses 54 provided in the bulbous head 44 of the dart mechanism. A forward portion of the inner surface of each of the legs may also be shaped to abut against the conical forward surface 56 of the portion 44 to assist in maintaining the cup in alignment with the dart while in flight. The reaward end of the cup is also provided with an aperture 57 through which the line 46 passes from the dart into the interior of the cup. In this form, the lure (not shown) which may be live bait, a spoon, or other form of artificial lure, is attached to the line 46 and contained within the cup 50 until the dart mechanism hits the water, at which time, the cup containing the bait will separate from the float portion 40 and sink to a level determined by the position of the stop 49.

I claim:

1. In apparatus for use with a fish lure attached to one end of a line, the other end of which line is to be payed out from a supply reel, the combination including a projectile for carrying said lure and said one end of the line, and a projector for propelling said projectile thru the air, said projectile having a specific gravity less than water and being provided with means to pay out a predetermined length of said line after landing on the water, said projectile being provided with a central passage extending completely therethrough, said line passing through said passage, said projectile also including a bait cup separably attached to the main body of the projectile, said bait cup being detachable from the body on impact with the water.

2. The invention as defined in claim 1, wherein a stop is attached to said line at a predetermined distance from said one end, said projectile being positioned between the stop and the lure.

3. The invention as defined in claim 1, wherein the mass of the projectile is concentrated adjacent the forward end.

4. The invention as defined in claim 1, wherein said projectile is provided with a tubular rear portion and a bulbous forward portion.

References Cited by the Examiner
UNITED STATES PATENTS

| | | | |
|---|---|---|---|
| 912,968 | 2/1909 | Laudermilch | 124—27 |
| 1,506,068 | 8/1924 | Lange | 124—26 |
| 2,225,719 | 12/1940 | Shotton | 43—19 |
| 2,404,249 | 7/1946 | Potter | 43—6 |
| 2,645,051 | 7/1953 | Stofleth | 43—44.9 X |
| 2,703,466 | 3/1955 | Badovinac | 43—19 |
| 2,910,798 | 11/1959 | Bias | 43—44.9 X |
| 3,059,370 | 10/1962 | Moore | 43—19 |
| 3,059,630 | 10/1962 | Oreskey | 43—19 X |
| 3,084,467 | 4/1963 | Bromwell | 43—19 |

ABRAHAM G. STONE, *Primary Examiner.*

SAMUEL KOREN, *Examiner.*

R. L. HOLLISTER, *Assistant Examiner.*